United States Patent [19]

Bucks

[11] Patent Number: 5,781,424
[45] Date of Patent: Jul. 14, 1998

[54] STATIC CONVERTER FOR AN INCANDESCENT LAMP HAVING A DELAYED START

[75] Inventor: Marcel J. M. Bucks, Eindhoven, Netherlands

[73] Assignee: U.S. Philips Corporation, New York, N.Y.

[21] Appl. No.: 848,085

[22] Filed: Jan. 10, 1996

Related U.S. Application Data

[63] Continuation of Ser. No. 112,738, Aug. 26, 1993, abandoned.

[30] Foreign Application Priority Data

Aug. 26, 1992 [NL] Netherlands ............... 92202598

[51] Int. Cl.$^6$ ............................................. H02M 7/517
[52] U.S. Cl. ....................................... 363/49; 363/98
[58] Field of Search .......................... 363/17, 49, 98, 363/132

[56] References Cited

U.S. PATENT DOCUMENTS

| | | | |
|---|---|---|---|
| 4,047,089 | 9/1977 | Suzuki et al. | 363/49 |
| 4,713,740 | 12/1987 | Drabing | 363/17 |
| 4,872,100 | 10/1989 | Diaz | 363/132 |
| 4,914,558 | 4/1990 | Flickinger | 363/17 |
| 5,036,253 | 7/1991 | Nilssen | 315/151 |
| 5,121,315 | 6/1992 | Moriya | 363/98 |
| 5,291,384 | 3/1994 | Mammano et al. | 363/17 |
| 5,321,235 | 6/1994 | Makino et al. | 363/49 |

*Primary Examiner*—Jeffrey L. Sterrett
*Attorney, Agent, or Firm*—Edward Blocker

[57] ABSTRACT

The invention relates to a circuit arrangement for operating an incandescent lamp with a current of periodically changing polarity, which circuit arrangement is provided with a static converter (I) with power switching means (T1, T2) and capacitive means (C1, C2) for generating the current of periodically changing polarity. The circuit arrangement also comprises starting means (II) for starting the static converter. According to the invention, the circuit arrangement is provided with delay means (III) which delay the start after connection of a supply source.

2 Claims, 1 Drawing Sheet

STATIC CONVERTER FOR AN INCANDESCENT LAMP HAVING A DELAYED START

This is a continuation of application Ser. No. 08/112,738, filed Aug. 26, 1993, now abandoned.

BACKGROUND OF THE INVENTION

The invention relates to a circuit arrangement for operating an incandescent lamp with a current of periodically changing polarity, which circuit arrangement is provided with a static converter suitable for connection to a supply source, with a first circuit comprising power switching means for generating the current of periodically changing polarity from the connected supply source, and a second circuit comprising capacitive means and lamp connection terminals, and starting means for starting the static converter.

A circuit arrangement of the kind mentioned in the opening paragraph is known from U.S. Pat. No. 5,036,253. In the known circuit arrangement, which is suitable inter alia for operating a halogen incandescent lamp, the static converter is constructed as a self-oscillating half-bridge commutator, the first circuit being formed by two bridge branches each comprising a power switch as the power switching means and the second circuit being formed by the circuit comprising the lamp connection terminals and the two bridge branches comprising capacitive means. The known circuit arrangement also comprises means by which the power supplied by the static converter is adjustable. This renders it possible to dim the lamp operated on the circuit arrangement. The power adjustment means are so constructed in this case that they act on the periodic restart of the static converter during operation.

The use of a half-bridge commutator has the advantage inter alia that only two power switches suffice, while the other two of the total of four bridge branches each comprise a capacitor.

In a modification of this type of static converter, capacitive means of double dimension are provided in the second circuit while one bridge branch is omitted. An incomplete half-bridge commutator is realised in that way.

It is a generally known characteristic of an incandescent lamp that the impedance of the lamp depends to an important degree on the temperature of the incandescent body present in the lamp. Thus the impedance of the incandescent body in the cold state will be much lower than in the operational state of the lamp. A result of this is that when the lamp is switched on through connection to the supply source, a comparatively great switch-on current will initially flow through the lamp, and consequently through the power switching means of the static converter. Subsequently, the impedance of the incandescent body will increase, partly also as a result of the dissipation occurring in the lamp, and the current through the lamp and the power switching means will accordingly decrease until an equilibrium situation has been reached.

It is found that the switch-on current and the accompanying high voltages across the power switching means which take place can be detrimental to the power switching means. The invention has for its object to provide a measure by which damage to the power switching means owing to the switch-on current through the lamp is prevented.

SUMMARY OF THE INVENTION

According to the invention, a circuit arrangement is for this purpose characterized in that the circuit arrangement comprises delay means for delaying the start of the static converter after connection of the supply source.

It is achieved with the delay means that a voltage is already applied across the capacitive means in the second circuit present in the static converter at the moment the lamp is switched on. A direct result is that the voltage across the lamp is already substantially limited at the moment the lamp is switched on, and consequently that also the switch-on current is limited.

Although it is possible for the delay means to be formed by a time switch with pre-set delay time, it is preferable that the delay means comprise voltage detection means for detecting the voltage across the capacitive means of the second circuit. It is possible by means of the voltage detection in a very simple manner to form a control signal for controlling the starting means the moment the capacitive means of the second circuit have reached a desired voltage.

Very suitable voltage detection means are voltage breakdown elements such as zener diodes, diacs, sidacs, but also elements such as voltage-dependent resistors (VDR) and voltage-dependent capacitors (VDC). All these elements have in common that the signal supplied by the element is in principle immediately suitable as a control signal.

BRIEF DESCRIPTION OF THE DRAWINGS

The described and other aspects of the invention will be explained in more detail with reference to a drawing, in which.

DETAILED DESCRIPTION OF THE PREFERRED EMBODIMENTS

Figure 1:
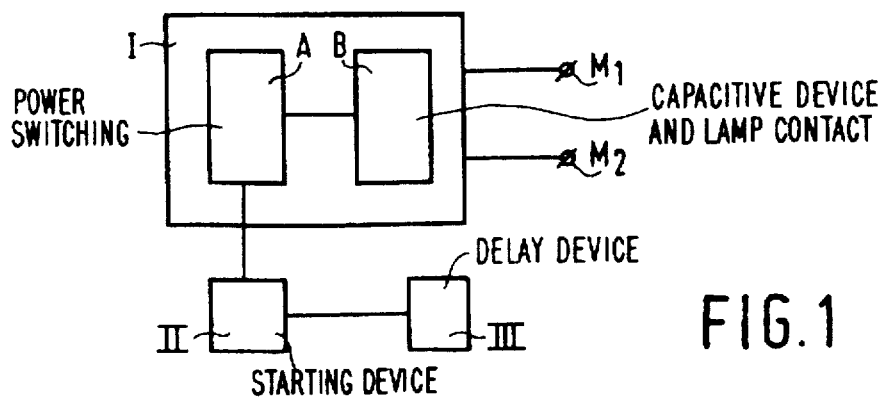
FIG. 1 is a block diagram of the circuit arrangement.

In FIG. 1, I is a static converter with a first circuit A in which power switching means for generating a current of periodically changing polarity are present, and a second circuit B in which capacitive means and lamp connection terminals are present. The static converter I is suitable for connection to a supply source via connection terminals M1, M2.

The circuit arrangement is further provided with starting means II for starting the static converter and with delay means III for delaying the start of the static converter after connection of the supply source.

Figure 2:
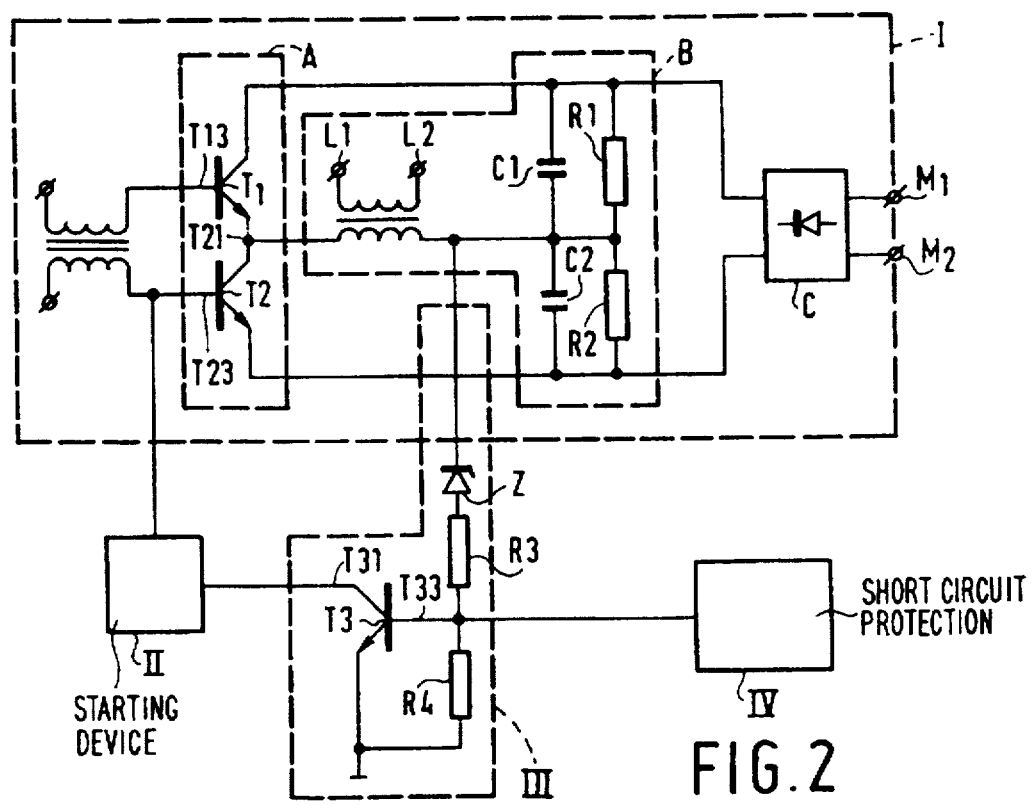
FIG. 2 is a circuit diagram of a practical embodiment of the circuit arrangement according to FIG. 1.

The static converter I shown in FIG. 2 is constructed as a self-oscillating half-bridge commutator in which the first circuit A is formed by two bridge branches each comprising a power switch T1, T2 as the power switching means, while the second circuit B is formed by the circuit comprising lamp connection terminals L1, L2 and two bridge branches comprising capacitive means C1, C2.

Control electrodes T13 and T23 are inductively coupled to one another in a manner known per se for achieving the self-oscillating behaviour of the static converter. The static converter is provided with supply source connection terminals M1, M2. In the embodiment shown, the circuit arrangement is suitable for connection to a 220 V, 50 Hz supply source. The static converter comprises besides the circuits A, B also a rectifier network C. The two bridge branches of the second circuit B each comprise an ohmic resistor R1, R2 connected in parallel to the relevant capacitive means C1, C2, by which a stable voltage division over the two bridge branches is promoted.

The delay means III comprise voltage detection means in the form of a zener diode Z which detects the voltage across the capacitive means C2 of the second circuit B. The zener diode Z is for this purpose connected with its anode to a voltage divider R3, R4 to which on the other side a control electrode T33 of a switch T3 is connected. An output T31 of the switch T3 is connected to the starting means II.

The operation of the circuit arrangement described is as follows. After connection of the supply source to the connection terminals M1, M2, a voltage will be present across the bridge branches of the second circuit B and divide itself over the two bridge branches. As long as the voltage across the capacitive means C2 lies above the zener voltage level of the zener diode Z, the control electrode T33 will be at a comparatively high voltage and consequently the switch T3 will be conducting, so that the starting means II are blocked. The moment the voltage across the capacitive means C2 has fallen to below the zener voltage level of the zener diode Z, the zener diode will enter its cut-off state. As a result the control electrode T33 will be at a comparatively low voltage and the switch T3 will enter the non-conducting state. This releases the starting means II and a start signal will be generated by the starting means II and conducted to the control electrode T23. The start signal renders the power switch T2 conducting, which means that the static converter I is started. The signal provided by the zener diode is used directly as a control signal in the manner described above. The rectified, non-smoothed supply source voltage, which also provides the supply of the power switching means T1, T2 in a manner known per se, has the result that the operation of the static converter I is periodically interrupted and restarted by the starting means II during operation.

In the practical embodiment, a short-circuit detection circuit IV is provided, connected to the control electrode T33, as a protection against a possible short-circuit in the static converter. Upon detection of a short-circuit condition, the detection circuit ensures that the control electrode T33 assumes a comparatively high voltage, so that the switch T3 becomes conducting.

Figure 3:
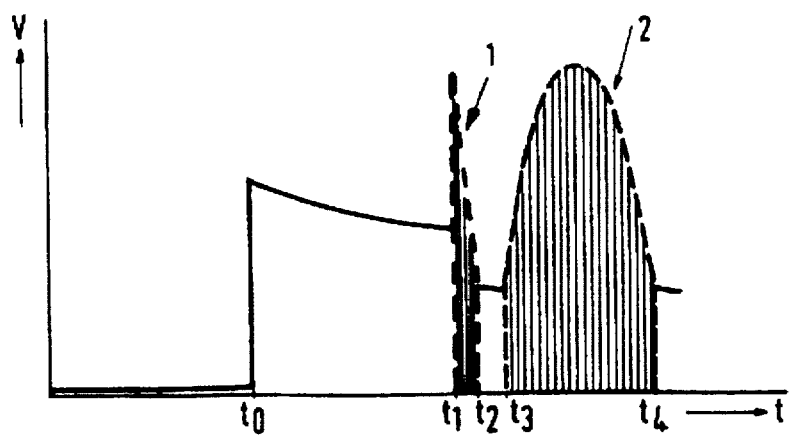
FIG. 3 shows a part of the voltage gradient across one of the power switching means of the circuit arrangement according to FIG. 2.

FIG. 3 shows the voltage gradient across the power switch T2 at point T21 (FIG. 2) as a function of time. Connection to the supply source takes place at moment t0. At moment t1, the voltage at point T21 has fallen to below the zener voltage level. The voltage at point T21 is half the voltage across the series arrangement of the capacitive means C1, C2 at moment t1. The total voltage across the capacitive means, accordingly, is approximately twice the zener voltage at moment t1. T2 is started through the released starting means thereby and the power switch T2 becomes conducting. Owing to the self-oscillating characteristic of the static converter, the power switch T2 is rendered conducting and non-conducting periodically with a high frequency, which leads to the periodic occurrence of a comparatively high and a comparatively low voltage at point T21. This is shown in the regions 1 and 2. Since the total voltage across the capacitive means C1, C2 is twice the zener voltage the moment the self-oscillation of the static converter starts, twice the zener voltage appears initially at point T21 as the high voltage. The voltage then drops very quickly to the instantaneous value of the rectified supply source voltage. A drop of the rectified voltage from the supply source leads to an interruption of the operation of the static converter I at moment t2, which operation is subsequently restarted at moment t3 by the starting means II. Such interruptions take place periodically during operation. The envelope of the regions 1 and 2 corresponds to the rectified supply source voltage. The voltage gradient between the moments t2 and t3 and after t4 is determined by the residual charge in the capacitive means C2 and the draining-off of this charge through resistor R2.

In a practical realisation of the embodiment described, the time difference between the moments t0 and t1 was 11.7 ms, the voltage at point T27 having dropped from 220 V to 179 V during this interval.

I claim:

1. A circuit arrangement for operating an incandescent lamp with a current of periodically changing polarity, which circuit comprises:

a static converter suitable for connection to a supply source, said static converter comprising a first circuit comprising power switching means for generating the current of periodically changing polarity from the connected supply source, and a second circuit comprising lamp connection terminals for connection to the incandescent lamp and capacitive means which controls the voltage across the incandescent lamp;

starting means for starting the static converter; and delay means for delaying the start of the static converter after connection of the supply source to allow the voltage across the lamp to decay to a level below that existing upon the connection of the supply source.

2. A circuit arrangement as claimed in claim 1, characterized in that the delay means comprise voltage detection means which detect the voltage across the capacitive means of the second circuit.

\* \* \* \* \*